US012460311B2

(12) United States Patent
Grosse-Brinkhaus et al.

(10) Patent No.: US 12,460,311 B2
(45) Date of Patent: Nov. 4, 2025

(54) LAMP BLACK PIGMENT CONTAINING ELECTRODEPOSITION COATING MATERIAL COMPOSITIONS

(71) Applicant: BASF Coatings GmbH, Münster (DE)

(72) Inventors: Karl-Heinz Grosse-Brinkhaus, Münster (DE); Britta Pennekamp, Münster (DE); Sebastian Berg, Münster (DE); Daniel Feldkamp, Münster (DE)

(73) Assignee: BASF COATINGS GMBH, Muenster (DE)

( * ) Notice: Subject to any disclaimer, the term of this patent is extended or adjusted under 35 U.S.C. 154(b) by 517 days.

(21) Appl. No.: 17/785,132

(22) PCT Filed: Dec. 18, 2020

(86) PCT No.: PCT/EP2020/086942
§ 371 (c)(1),
(2) Date: Jun. 14, 2022

(87) PCT Pub. No.: WO2021/123106
PCT Pub. Date: Jun. 24, 2021

(65) Prior Publication Data
US 2022/0396892 A1 Dec. 15, 2022

(30) Foreign Application Priority Data

Dec. 19, 2019 (EP) ..................... 19218205

(51) Int. Cl.
*C25D 1/00* (2006.01)
*C08K 3/04* (2006.01)
*C09D 5/44* (2006.01)

(52) U.S. Cl.
CPC ............... *C25D 1/00* (2013.01); *C08K 3/04* (2013.01); *C09D 5/4492* (2013.01); *C08K 2201/003* (2013.01); *C09D 5/4496* (2013.01)

(58) Field of Classification Search
CPC ...... C09D 5/4438; C09D 5/4488; C09C 1/48; C08K 3/04–3/046
See application file for complete search history.

(56) References Cited

U.S. PATENT DOCUMENTS

| 4,812,215 A * | 3/1989 | Karabin ............... C09D 5/4488 523/411 |
| 5,782,968 A | 7/1998 | Hirayama et al. |
| 2010/0179270 A1* | 7/2010 | Zoch ..................... C09D 7/61 524/495 |
| 2013/0122307 A1* | 5/2013 | Grabbe .................. B05D 7/542 427/458 |

FOREIGN PATENT DOCUMENTS

| GB | 1531621 A | * 11/1978 | ......... C08G 18/0814 |
| GB | 2129807 A | * 5/1984 | ............. B05D 7/546 |
| GB | 2379897 A | * 3/2003 | ............ B05D 7/532 |
| JP | 2001321722 A | 11/2001 | |
| JP | 2002339099 A | 11/2002 | |

OTHER PUBLICATIONS

International Search Report and Written Opinion for corresponding PCT/EP2020/086942, mailed Mar. 29, 2021, 10 Pages.

* cited by examiner

*Primary Examiner* — Prashant J Khatri
(74) *Attorney, Agent, or Firm* — Armstrong Teasdale LLP

(57) ABSTRACT

Described herein is an aqueous cathodically depositable electrodeposition coating material composition including at least one cathodically depositable polymer (a) and at least one carbon black pigment (b), where the at least one carbon black pigment (b) is a lamp black pigment having a number-based median primary particle size ($d_{N,50\%}$) of at least 50 nm and at most 200 nm. Also described herein is a method for at least partially coating an electrically conductive substrate by cathodic electrodeposition coating including immersing the substrate at least partially into an electrodeposition coating bath, which includes the electrodeposition coating material composition. Also described herein is an electrically conductive substrate, which is at least partially coated with a baked electrodeposition coating material composition and/or which is obtainable by the method. Further, described herein is a method of using the carbon black pigment (b) for improving corrosion protection and/or homogeneity of the film build.

18 Claims, No Drawings

LAMP BLACK PIGMENT CONTAINING ELECTRODEPOSITION COATING MATERIAL COMPOSITIONS

CROSS-REFERENCE TO RELATED APPLICATIONS

This application is a U.S. National Phase Application of PCT/EP2020/086942, filed Dec. 18, 2020, which claims the benefit of priority to European Patent Application No. 19218205.3, filed Dec. 19, 2019, the entire contents of which are hereby incorporated by reference herein.

The present invention relates to an aqueous cathodically depositable electrodeposition coating material composition comprising at least one cathodically depositable polymer (a) and at least one carbon black pigment (b), wherein the at least one carbon black pigment (b) is a lamp black pigment having a number-based median primary particle size ($d_{N,50\%}$) of at least 50 nm and at most 200 nm, a method for at least partially coating an electrically conductive substrate by cathodic electrodeposition coating comprising at least steps (1) to (5) including the step (1) of immersing of the substrate at least partially into an electrodeposition coating bath, which comprises the inventive electrodeposition coating material composition, an electrically conductive substrate, which is at least partially coated with a baked inventive electrodeposition coating material composition and/or which is obtainable by the inventive method, and a use of the carbon black pigment (b) for improving the corrosion protection and/or homogeneity of the film build.

BACKGROUND OF THE INVENTION

In the automobile sector, the metallic components used for manufacture must customarily be protected against corrosion. The requirements in terms of the corrosion control to be achieved are very exacting, not least because the manufacturers often offer a guarantee against rust perforation over many years. Such corrosion control is customarily achieved through the coating of the components, or of the substrates used to manufacture them, with at least one coating suitable for that purpose.

In order to be able to ensure the necessary corrosion control, it is common practice to apply an electrodeposition coating film to the metallic substrate, this substrate having possibly been pretreated by phosphatizing and/or by other kinds of pretreatments. Electrodeposition coating (electrocoat) materials are coating materials which comprise polymers as binders including optionally crosslinkers, pigments and/or fillers, and, frequently, additives. In general, there are anodically and cathodically depositable electrocoat materials. Anodic electrodeposition coating compositions comprising inter alia metal effect pigments are, e.g., disclosed in WO 2006/117189 A1. However, cathodically depositable materials have the greatest importance in industrial coating and particularly in automotive finishing. In cathodic electrodeposition coating, the substrates to be coated are immersed into an electrocoating bath and connected as the cathode. The bath has an anode as the counterelectrode. The particles of the electrocoating material are stabilized with positive charge and deposit on the cathode to form a coating film. Following deposition, the coated substrate is removed from the electrocoating bath and the coating film is baked, i.e., thermally cured.

Cathodically depositable electrocoat materials are known in the prior art, for example in EP 1 041 125 A1, DE 197 03 869 A1 and in WO 91/09917 A2. In addition, coating compositions in general comprising an effective corrosion-inhibiting amount of a carbon pigment are disclosed in WO 2004/065498 A2.

The metallic substrates used in the automotive industry, which have to be protected against corrosion, are usually multiple different metallic substrates such as, e.g., bare steel, phosphatized steel and/or steel substrates, which has been pretreated by at least one other pretreatment method. Furthermore, these multiple different metallic substrates are often additionally or alternatively pretreated mechanically, for example by sanding processes, depending on the desired surface properties. The differences in the material surface properties of the substrates may lead to differences in the application process, when applying an electrodeposition coating material onto their surface as differences in the film build height may result due to the different material/surface properties of the substrates. The occurrence of such different film build heights is undesired as these differences need to be covered and levelled out by the subsequently applied coating material such as primer coating materials in order to prevent telegraphing to the surface of the total automotive coating. Such a covering and/or levelling out often requires a cost-intensive post-treatment process, which has to be performed manually.

Thus, there is a need to be able to provide an electrodeposition coating material, which allows for a homogeneous film build during application of the electrodeposition coating material onto the optionally pretreated surface of the substrate independently of the substrate material used and/or of the pretreatment method used for pretreating said substrate material, without impairing the corrosion protection properties.

Problem

It has been therefore an object underlying the present invention to provide an electrodeposition coating material, which allows for a homogeneous film build during its application onto a variety of optionally pretreated surfaces of metallic substrate independently of the substrate material used and/or of the pretreatment method used.

Solution

This object has been solved by the subject-matter of the claims of the present application as well as by the preferred embodiments thereof disclosed in this specification, i.e. by the subject matter described herein.

A first subject-matter of the present invention is an aqueous cathodically depositable electrodeposition coating material composition comprising (a) at least one cathodically depositable polymer and (b) at least one carbon black pigment, wherein the at least one carbon black pigment (b) is a lamp black pigment having a number-based median primary particle size ($d_{N,50\%}$) of at least 50 nm and at most 200 nm.

A further subject-matter of the present invention is a method for at least partially coating an electrically conductive substrate by cathodic electrodeposition coating comprising at least steps (1) to (5), namely (1) immersing of the electrically conductive substrate at least partially into an electrodeposition coating bath, which comprises the inventive electrodeposition coating material composition, (2) connecting the substrate as cathode, (3) depositing a coating film obtained from the electrodeposition coating material composition on the substrate using direct current, (4) removing the coated substrate from the electrodeposition coating bath, and (5) baking the coating film deposited on the substrate.

A further subject-matter of the present invention is an electrically conductive substrate, which is at least partially coated with a baked inventive electrodeposition coating material composition and/or which is obtainable by the inventive method.

A further subject-matter of the present invention is a use of the at least one carbon black pigment (b) as defined above and hereinafter in the specification for improving the corrosion protection of electrically conductive substrates bearing a baked coating film obtained from an aqueous cathodically depositable electrodeposition coating material compositions comprising—besides the at least one carbon black pigment (b)—at least one cathodically depositable polymer (a) and/or for improving the homogeneity of the film build and/or for reducing the mapping of a coating film obtained from an aqueous cathodically depositable electrodeposition coating material compositions comprising—besides the at least one carbon black pigment (b)—at least one cathodically depositable polymer (a).

It has been surprisingly found that the inventive electrodeposition coating material composition allows for a homogeneous film build during its application onto the optionally pretreated surface of the substrate independently of the substrate material used and/or of its optional prior pretreatment. Thus, it has been unexpectedly found that no or at least significantly reduced undesired film-build deviations due to the different surface properties of the substrate are observed, when applying the inventive electrodeposition coating material composition onto these substrates, for example onto bare steel and phosphatized steel substrates. It has been in particular found that this unexpected technical effect is a result of the specific pigment (b) present in the coating material composition. This is surprising as carbon black pigments are usually merely incorporated into electrodeposition coating material composition in order to provide an overall gray color of the resulting electrodeposition coating film.

Moreover, it has been surprisingly found that—besides the improved homogeneity of the film build—also the corrosion protection of the substrate is additionally improved. Furthermore, it has been found that other properties of the obtained electrodeposited film such as the surface roughness are not negatively influenced.

In particular, it has been found that the above described advantages and technical effects are only observed when using the specific carbon black pigment (b) as defined above, i.e. being a lamp black pigment having a number-based median primary particle size ($d_{N,50\%}$) of at least 50 nm and at most 200 nm. As it is evident from the experimental part of this document, such advantages and effects are not achieved when using other carbon black pigments such as furnace black pigments or lamp black pigments not fulfilling the above defined number-based median primary particle size criteria.

DETAILED DESCRIPTION OF THE INVENTION

The term "comprising" in the sense of the present invention, in connection for example with the electrodeposition coating material composition of the invention, preferably has the meaning of "consisting of". With regard to the electrodeposition coating material composition of the invention it is possible—in addition to components (a), (b) and water—for one or more of the further components identified hereinafter and included optionally in the electrodeposition coating material composition of the invention to be included therein. All components may in each case be present in their preferred embodiments as identified below.

Inventive Electrodeposition Coating Material Composition

The cathodically depositable aqueous electrodeposition coating material composition of the invention (also named hereinafter inventive electrodeposition coating material composition) comprises at least the components (a), (b) and also water. The terms "electrodeposition coating material composition" and "electrodeposition coating composition" used herein are interchangeable.

The cathodically depositable aqueous electrodeposition coating material composition of the invention is suitable for at least partially coating an electrically conductive substrate with an electrodeposition coating composition, meaning that it is suitable for an at least partial application to the substrate surface of an electrically conductive substrate, which application leads an electrodeposition coating film onto the surface of the substrate.

The cathodically depositable electrodeposition coating material composition of the invention is aqueous. The term "aqueous" in connection with the electrodeposition coating material composition of the invention is understood preferably for the purposes of the present invention to mean that water, as solvent and/or as diluent, is present as the main constituent of all solvents and/or diluents present in the electrodeposition coating material composition, preferably in an amount of at least 35 wt.-%, based on the total weight of the electrodeposition coating composition of the invention. Organic solvents may be present additionally in smaller proportions, preferably in an amount of <20 wt.-%.

The electrodeposition coating composition of the invention preferably includes a water fraction of at least 40 wt.-%, more preferably of at least 50 wt.-%, still more preferably of at least 60 wt.-%, yet more preferably of at least 65 wt.-%, in particular of at least 70 wt.-%, most preferably of at least 75 wt.-%, based in each case on the total weight of the electrodeposition coating composition.

The electrodeposition coating composition of the invention preferably includes a fraction of organic solvents that is <10 wt.-%, more preferably in a range of from 0 to <10 wt.-%, very preferably in a range of from 0 to <7.5 wt.-% or of from 0 to <5 wt.-% or of from 0 to 2 wt.-%, based in each case on the total weight of the electrodeposition coating composition. Examples of such organic solvents would include heterocyclic, aliphatic, or aromatic hydrocarbons, mono- or polyhydric alcohols, especially methanol and/or ethanol, ethers, esters, ketones, and amides, such as, for example, N-methylpyrrolidone, N-ethylpyrrolidone, dimethylformamide, toluene, xylene, butanol, ethylene glycol, propylene glycol and butyl glycol ethers and also their acetates, butyl diglycol, diethylene glycol dimethyl ether, cyclohexanone, methyl ethyl ketone, methyl isobutyl ketone, acetone, isophorone, or mixtures thereof.

The solids content of the electrodeposition coating material composition of the invention is preferably in a range of from 5 to 35 wt.-%, more preferably of from 7.5 to 30 wt.-%, very preferably of from 10 to 27.5 wt.-%, more particularly of from 12.5 to 25 wt.-%, most preferably of from 15 to 22.5 wt.-% or of from 15 to 20 wt.-%, based in each case on the total weight of the electrodeposition coating composition.

The solids content, in other words the nonvolatile fraction, is determined in accordance with the method described hereinafter.

The electrodeposition coating material composition of the invention preferably has a pH in the range of from 2.0 to 10.0, more preferably in the range of from 2.5 to 9.5 or in the range of from 2.5 to 9.0, very preferably in the range of from 3.0 to 8.5 or in the range of from 3.0 to 8.0, more particularly in the range of from 2.5 to 7.5 or in the range of from 3.5 to 7.0, especially preferably in the range of from 4.0 to 6.5, most preferably in the range of from 3.5 to 6.5 or of from 5.0 to 6.0.

The electrodeposition coating material of the composition includes component (a) preferably in an amount in a range of from 15 to 85 wt.-%, more preferably of from 20 to 80 wt.-%, very preferably of from 25 to 77.5 wt.-%, more particularly of from 30 to 75 wt.-% or of from 35 to 75 wt.-%, most preferably of from 40 to 70 wt.-% or of from 45 to 70 wt.-% or of from 50 to 70 wt.-%, based in each case on the total solids content of the electrodeposition coating composition. Alternatively, the electrodeposition coating material composition of the invention includes component (a) preferably in an amount in a range of from 1 to 40 wt.-%, more preferably of from 2.5 to 37.5 wt.-%, very preferably of from 4 to 35 wt.-%, more particularly of from 5.5 to 32.5 wt.-%, most preferably of from 7 to 30 wt.-% or of from 8 to 25 wt.-%, based in each case on the total weight of the electrodeposition coating material composition.

The electrodeposition coating material of the composition includes component (b) preferably in an amount in a range of from 0.005 to 4.0 wt.-%, more preferably of from 0.007 to 2.5 wt.-%, very preferably of from 0.010 to 1.5 wt.-%, more particularly of from 0.015 to 1.0 wt.-%, most preferably of from 0.020 to 0.5 wt.-% or of from 0.025 to 0.1 wt.-%, based in each case on the total weight of the electrodeposition material coating composition.

The electrodeposition coating material composition includes component (b) preferably in an amount in a range of from 0.050 to 5.0 wt.-%, more preferably of from 0.060 to 4.0 wt.-%, very preferably of from 0.070 to 3.0 wt.-%, more particularly of from 0.080 to 2.0 wt.-%, yet more preferably of from 0.09 to 1.5 wt.-%, still more preferably of from 0.10 to 1.0 wt.-%, most preferably of from 0.12 to 0.75 wt.-% or of from 0.13 to 0.5 wt.-%, based in each case on the total solids content of the electrodeposition coating material composition.

In case the electrodeposition coating material composition of the invention additionally includes at least one crosslinking agent component (c), said component (c) is preferably present in an amount in the range of from 5 to 45 wt.-%, more preferably of from 6 to 42.5 wt.-%, very preferably of from 7 to 40 wt.-%, more particularly of from 8 to 37.5 wt.-% or of from 9 to 35 wt.-%, most preferably of from 10 to 35 wt.-%, especially preferably of from 15 to 35 wt.-%, based in each case on the total solids content of the electrodeposition coating composition. Alternatively, in case the electrodeposition coating composition of the invention additionally includes at least one crosslinking agent component (c), said component (c) is preferably present in an amount in a range of from 0.5 to 30 wt.-%, more preferably of from 1 to 25 wt.-%, very preferably of from 1.5 to 20 wt.-%, more particularly of from 2 to 17.5 wt.-%, most preferably of from 2.5 to 15 wt.-%, especially preferably of from 3 to 10 wt.-%, based in each case on the total weight of the electrodeposition coating material composition.

The electrodeposition coating material composition of the invention preferably includes no component which has olefinically unsaturated double bonds. More particularly, none of components (a) and (c) of the electrodeposition coating material composition of the invention contains olefinically unsaturated double bonds.

The fractions in wt.-% of all of the components (a), (b) and water included in the electrodeposition coating composition of the invention, and also of further components that may be present additionally as component (c), add up to 100 wt.-%, based on the total weight of the electrodeposition coating material composition.

The relative weight ratio of components (a) and (c)—if component (c) is present—to one another in the electrodeposition coating material composition is preferably in a range of from 5:1 to 1.1:1, more preferably in a range of from 4.5:1 to 1.1:1, very preferably in a range of from 4:1 to 1.2:1, more particularly in a range of from 3:1 to 1.5:1.

Component (a)

Component (a) is at least one cathodically depositable polymer, which preferably functions as at least one binder in the inventive electrodeposition coating material composition. Simultaneously, component (a) may also function as grinding resin as it will be outlined hereinafter in more detail.

Any polymer is suitable as binder and thus as component (a) as long as it is cathodically depositable. Preferred are poly(meth)acrylates, (meth)acrylate copolymers, and epoxide polymers.

Preferably, component (a) of the electrodeposition coating composition of the invention comprises and/or is at least one epoxide-amine adduct.

An epoxide-amine adduct for the purposes of the present invention is a reaction product of at least one epoxy resin and at least one amine. Epoxy resins used are more particularly those based on bisphenol A and/or derivatives thereof. Amines reacted with the epoxy resins are primary and/or secondary amines or salts thereof and/or salts of tertiary amines.

The at least one epoxide-amine adduct used as component (a) is preferably a cationic, epoxide-based and amine-modified resin. The preparation of such cationic, amine-modified, epoxide-based resins is known and is described for example in DE 35 18 732, DE 35 18 770, EP 0 004 090, EP 0 012 463, EP 0 961 797 B1, and EP 0 505 445 B1. Cationic, epoxide-based, amine-modified resins are understood preferably to be reaction products of at least one polyepoxide having preferably two or more, e.g., three, epoxide groups, and at least one amine, preferably at least one primary and/or secondary amine. Particularly preferred polyepoxides are polyglycidyl ethers of polyphenols that are prepared from polyphenols and epihalohydrins. Polyphenols used may in particular be bisphenol A and/or bisphenol F. Other suitable polyepoxides are polyglycidyl ethers of polyhydric alcohols, such as, for example, of ethylene glycol, diethylene glycol, triethylene glycol, propylene 1,2-glycol, propylene 1,4-glycol, 1,5-pentanediol, 1,2,6-hexanetriol, glycerol, and 2,2-bis(4-hydroxycyclohexyl)propane. The polyepoxide used may also be a modified polyepoxide. Modified polyepoxides are understood to be those polyepoxides in which some of the reactive functional groups have been reacted with at least one modifying compound. Examples of such modifying compounds are as follows:

i) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkyl carboxylic acids (e.g., lactic acid, dimethylolpropionoic acid), and carboxyl-containing polyesters, or ii) compounds containing amino groups, such as diethylamine or ethylhexylamine or diamines with secondary amino groups, e.g., N,N'-dialkylalkylenediamines, such as dimethylethylenediamine, N,N'-dialkyl-polyoxyalkyleneamines, such as N,N'-dimethylpolyoxypropylenediamine, cyanoalkylated alkylenediamines, such as bis-N,N'-cyanoethylethylenediamine, cyanalkylated polyoxyalkyleneamines, such as bis-N, N'-cyanoethylpolyoxypropylenediamine, polyaminoamides, such as, for example, Versamides, especially amino-terminated reaction products of diamines (e.g., hexamethylenediamine), polycarboxylic acids, especially dimer fatty acids and monocarboxylic acids, more particularly fatty acids, or the reaction product of one mole of diaminohexane with two moles of monoglycidyl ether or monoglycidyl ester, especially glycidyl esters of α-branched fatty acids, such as Versatic acid, or iii) compounds containing hydroxyl groups, such as neopentyl glycol, bisethoxylated neopentyl glycol, neopentyl glycol hydroxypivalate, dimethylhydantoin-N,N'-diethanol, hexane-1,6-diol, hexane-2,5-diol, 1,4-bis(hydroxymethyl)cyclohexane, 1,1-isopropylidenebis(p-phenoxy)-2-propanol, trimethylolpropane, pentaerythritol or amino alcohols, such as triethanolamine, methyldiethanolamine, or hydroxyl-group-containing alkylketimines, such as aminomethylpropane-1,3-diol methylisobutylketimine or tris(hydroxymethyl)aminomethane cyclohexanoneketimine, and also polyglycol ethers, polyester polyols, polyether polyols, polycaprolactone polyols, polycaprolactam polyols of various functionalities and molecular weights, or iv) saturated or unsaturated fatty acid methyl esters, which are esterified with hydroxyl groups of the epoxy resins in the presence of sodium methoxide.

Examples of amines which can be used for preparing component (a) are mono- and dialkylamines, such as methylamine, ethylamine, propylamine, butylamine, dimethylamine, diethylamine, dipropylamine, methylbutylamine, alkanolamines, such as methylethanolamine or diethanolamine, dialkylaminoalkylamines, such as dimethylaminoethylamine, diethylaminopropylamine, or dimethylaminopropylamine, for example. The amines which can be used may also include other functional groups as well, provided they do not disrupt the reaction of the amine with the epoxide group of the optionally modified polyepoxide and also do not lead to gelling of the reaction mixture. Secondary amines are preferably used. The charges that are needed for dilutability with water and for electrical deposition may be generated by protonation with water-soluble acids (e.g., boric acid, formic acid, acetic acid, lactic acid; preferably acetic acid and/or formic acid). A further way of introducing cationic groups into the optionally modified polyepoxide is to react epoxide groups of the polyepoxide with amine salts.

The epoxide-amine adduct which can be used as component (a) is preferably a reaction product of an epoxy resin based on bisphenol A and primary and/or secondary amines or salts thereof and/or the salt of a tertiary amine.

Component (b)

The electrodeposition coating material composition of the invention comprises at least one carbon black pigment as component (b), which is a lamp black pigment.

The term "pigment" is known to the skilled person, from DIN 55943 (date: October 2001), for example. A "pigment" in the sense of the present invention refers preferably to a component in powder or flake form which is substantially, preferably entirely, insoluble in the medium surrounding them, such as the electrodeposition coating material composition of the invention, for example. Pigments are preferably colorants and/or substances which can be used as pigment on account of their magnetic, electrical and/or electromagnetic properties. Pigments differ from "fillers" preferably in their refractive index, which for pigments is 1.7.

Carbon black pigments in general are produced by the thermal decomposition of hydrocarbons (liquid and gaseous hydrocarbons) under controlled conditions, i.e. by an oxidative pyrolysis process, most commonly through incomplete combustion of the feedstock. The most common source of feedstock for the production of carbon black is a heavy stream of hydrocarbon derived from coal or crude oil processing, which is referred to as carbon black oil (CBO). CBO usually mainly contains polycyclic aromatic hydrocarbon feedstock oils. Natural gas, distillates from coal tar (carbochemical oils) or residual oils that are created by catalytic cracking of petroleum fractions and olefins manufactured by the thermal cracking of naphtha or gasoil (petrochemical oil) are the key sources of this raw material. Production methods differ based on the way the heat and decomposition stages are arranged. The resulting carbon black product (e. g., lamp black, gas black or furnace black) is filtered from the off-gassing of the production process. Manufacturing methods include furnace, gas, lamp and thermal black processes.

More than 98% of the world's annual carbon black production is achieved through the furnace black process. The furnace black method is continuous and uses liquid and gaseous hydrocarbons as feedstock. The heated liquid feedstock is sprayed into a heat source generated by the combustion of natural gas or fuel oil and pre-heated air. Because it occurs at a very high temperature, the reaction is confined to a refractory-lined furnace. After the carbon black is formed, the process mixture is quenched by the injection of water. This also prevents any unwanted secondary reactions. The carbon clack-laden gas then passes through a heat exchanger for further cooling while simultaneously heating the required pre-heated air for process combustion. A bag filter separates the carbon black particles from the gas stream. The gases produced by the reaction are combustible and in most cases are burned in a boiler to generate steam and/or electricity or are alternatively flared. The carbon black collected by the filter has a very low bulk density and, depending on the application, is usually pelletized or further densified to facilitate onward handling.

The gas black process uses vaporized oils as a feedstock. The oil is heated and the resultant vapors are carried by hydrogen rich gas into a tube fitted with numerous burners. The individual particles impinge on the surface of a water-cooled drum. A portion of the carbon black generated is deposited on the roller, while the rest enters the filter system. Then the two carbon black streams are combined. Onward processing is similar to the furnace black process. The thermal black process of producing carbon black is a semi-batch method, with natural gas as the most commonly used feedstock, although higher grade hydrocarbon oils can also be used. It involves the thermal decomposition of the feedstock in a refractory lined vessel, which decomposes the natural gas into carbon black and hydrogen.

Lamp black is a specialty carbon black produced through the incomplete combustion of carbon black oil similar to the furnace black process, except that combustion occurs in a large, open, shallow vessel. Lamp black is the oldest industrial scale production process for carbon Black still in use. The lamp black pigment (b) is produced by this process.

Preferably, the inventive electrodeposition coating material composition does not contain any furnace black, gas black and/or thermal black pigments. Moreover, preferably, the at least one pigment (b) is the only lamp black carbon black pigment present in the inventive electrodeposition coating material composition. In particular, the at least one pigment (b) is the only carbon black pigment at all present in the inventive electrodeposition coating material composition.

The at least one carbon black pigment (b) has a number-based median primary particle size ($d_{N,50\%}$) of at least 50 nm and at most 200 nm. The term number-based median particle size ($d_{N,50\%}$) is a parameter known to a person skilled in the art. The characteristic variable labeled with the lower-case letter "d" is the percentile (50%) of the cumulative distribution curve with the 50% percentile corresponding to the median. The index "N" pertains to the number-based distribution.

Preferably, the at least one carbon black pigment (b) has a number-based median primary particle size ($d_{N,50\%}$) of at least 75 nm and at most 150 nm, more preferably of at least 80 nm and at most 120 nm, still more preferably of at least 85 nm and at most 110 nm, in particular of at least 90 nm and at most 105 nm.

Preferably, the at least one carbon black pigment (b) has an average primary particle size of at least 50 nm and at most 200 nm, more preferably of at least 60 nm and at most 175 nm, even more preferably of at least 70 nm and at most 160 nm, still more preferably of at least 80 nm and at most 150 nm, yet more preferably of at least 85 nm and at most 140 nm, in particular of at least 90 nm and at most 130 nm, most preferably of at least 95 nm and at most 125 nm.

Preferably, the at least one carbon black pigment (b) has an primary particle size in the range of from 5 nm to 600 nm, with 5 nm being the minimum measured primary particle size and 600 nm being the maximum measured primary particle size.

Number-based median primary particle size ($d_{N,50\%}$), average primary particle size and primary particle size, in particular minimum and maximum values of the primary particle size, are determined by transmission electron microscopy (TEM) for the purposes of the present invention. The measurement method is described hereinafter in the "Methods" section.

Preferably, the at least one carbon black pigment (b) has a pH value in the range of from >6 to 10. Lamp black pigments suitable as components (b) are commercially available.

Preferably, the at least one carbon black pigment (b) does not contain more than 50 ppm, more preferably not more than 30 ppm, even more preferably not more than 20 ppm, in particular not more than 10 ppm, most preferably not more than 4 ppm, of sulfur in a water-soluble fraction obtained from the at least one carbon black pigment (b) as measured by ICP-OES in accordance with DIN EN ISO 11885:2009-09. The measurement method is described hereinafter in the "Methods" section.

Component (b) is preferably incorporated in the form of a pigment paste into the electrodeposition coating material composition. Besides the pigment (b), further pigments each being different from the pigment (b) and/or fillers can be present and preferably are present in said pigment paste. Such pastes typically include at least one polymer used as grinding resin. Preferably, therefore, there is at least one such polymer used as grinding resin included in the electrodeposition coating composition of the invention. It is possible that the at least one polymer (a) used as binder in the electrodeposition coating material composition can also additionally function as grinding resin in the pigment paste. The grinding resin in question is preferably an epoxide-amine adduct, which as outlined above may correspond to and/or can be subsumed under the definition of component (a). The polymer used as grinding resin preferably has building blocks which interact with the surfaces of the pigments. The grinding resins therefore preferably have the effect of an emulsifier. In many cases quaternary ammonium compounds are incorporated for the purpose of improving the grinding resin properties. The pigments are preferably ground together, i.e. milled, with a grinding resin to form a pigment paste. Milling is performed conventionally by making use of standard mills. To produce the finished electrodeposition coating material composition, this paste is mixed with the rest of the constituents. The use of a pigment paste leads advantageously to a greater flexibility in electrodeposition coating, since the pigment and binder of the electrodeposition coating material composition can be readily adapted at any time to the requirements of practice via the amount of the pigment paste.

Where the electrodeposition coating material composition of the invention comprises at least one polymer used as grinding resin, which is different from polymer (a), said polymer is included preferably in an amount in a range of from 0.5 to 10 wt.-%, more preferably of from 0.5 to 7.5 wt.-%, very preferably of from 0.75 to 5 wt.-% in the electrodeposition coating material composition, based in each case on the total weight of the electrodeposition coating material composition.

Preferably, the inventive coating material composition is obtainable from mixing a pigment paste comprising at least the at least one carbon black pigment (b) with a mixture comprising at least water and the polymer (a).

In case the at least one pigment (b) is incorporated into a pigment paste—which may contain one or more further pigments and/or fillers each being different from pigment (b) as component(s) (d)—and said pigment paste is used as a precursor for preparing the electrodeposition coating material composition of the invention, the pigment paste preferably contains component (b) in an amount in a range of from 0.10 to 10.0 wt.-%, more preferably of from 0.15 to 7.5 wt.-%, very preferably of from 0.20 to 5.0 wt.-%, more particularly of from 0.25 to 3.5 wt.-%, yet more preferably of from 0.30 to 2.0 wt.-%, still more preferably of from 0.35 to 1.5 wt.-%, most preferably of from 0.35 to 1.0 wt.-%, based in each case on the total weight of the pigment paste. Preferably, the at least one pigment (b) is the only carbon black pigment present in said pigment paste.

Optional Component (c)

At least one crosslinking agent can be present in the electrodeposition coating material composition as component (c), which is selected from the group consisting of blocked polyisocyanates, free polyisocyanates, amino resins, and mixtures thereof. Said component (c) is different from component (a).

The term "blocked polyisocyanates" is known to the skilled person. Blocked polyisocyanates which can be utilized are polyisocyanates having at least two isocyanate groups (diisocyanates in case of precisely two isocyanate groups), but preferably having more than two, such as, for example, 3 to 5 isocyanate groups, wherein the isocyanate groups have been reacted, so that the blocked polyisocyanate formed is stable in particular with respect to hydroxyl groups and amino groups such as primary and/or secondary amino groups at room temperature, i.e., at a temperature of 18 to 23° C., but at elevated temperatures, as for example at ≥80° C., ≥110° C., ≥130° C., ≥140° C., ≥150° C., ≥160° C., ≥170° C., or 180°, reacts with conversion and with formation of urethane and/or urea bonds, respectively.

In the preparation of the blocked polyisocyanates it is possible to use any desired organic polyisocyanates suitable for crosslinking. Isocyanates used preferably are (hetero) aliphatic, (hetero)cycloaliphatic, (hetero)aromatic or (hetero)aliphatic-(hetero)aromatic isocyanates. Preferred polyisocyanates are those containing 2 to 36, especially 6 to 15, carbon atoms. Preferred examples are ethylene 1,2-ethylene diisocyanate, tetramethylene 1,4-diisocyanate, hexamethylene 1,6-diisocyanate (HDI), 2,2,4(2,4,4)-tri-methylhexamethylene 1,6-diisocyanate (TMDI), diphenylmethane diisocyanate (MDI), 1,9-diisocyanato-5-methylnonane, 1,8-diisocyanato-2,4-dimethyloctane, dodecane 1,12-diisocyanate, ω,ω'-di-isocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethyl-cyclohexane, decahydro-8-methyl(1,4-methanonaphthalen-2 (or 3),5-ylenedimethylene diisocyanate, hexahydro-4,7-methanoindan-1 (or 2),5 (or 6)-ylenedimethylene diisocyanate, hexahydro-4,7-methanoindan-1 (or 2),5 (or 6)-ylene diisocyanate, hexahydro-tolylene 2,4- and/or 2,6-diisocyanate (H6-TDI), toluene 2,4- and/or 2,6-diisocyanate (TDI), perhydrodiphenylmethane 2,4'-diisocyanate, perhydrodiphenylmethane 4,4'-diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethyl-benzene, 1,4-di-isocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diiso-cyanatomethylcyclohexane, 2,5(2,6)-bis(isocyanatomethyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate, more particularly the corresponding isocyanurates. It is also possible, furthermore, to utilize mixtures of polyisocyanates.

For the blocking of the polyisocyanates it is possible with preference to use any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols, such as cyclopentanol and cyclohexanol; aromatic alkyl alcohols, such as phenylcarbinol and methylphenylcarbinol. Likewise, suitable diols such as ethanediol 1,2-propanediol, 1,3-propanediol and/or polyols may also be used for blocking of the polyisocyanates. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

Tris(alkoxycarbonylamino)-1,3,5-triazine (TACT) are likewise known to the skilled person. The use of tris (alkoxycarbonylamino)-1,3,5-triazines as crosslinking agents in coating material compositions is known. For example, DE 197 12 940 A1 describes the use of such crosslinking agents in basecoat materials. U.S. Pat. No. 5,084,541 describes the preparation of corresponding compounds which can be used as component (c). Such triazines are for the purposes of the present invention to be encompassed by the term "blocked polyisocyanates".

Amino resins (aminoplast resins) are likewise known to the skilled person. Amino resins used are preferably melamine resins, more particularly melamine-formaldehyde resins, which are likewise known to the skilled person. Preference, however, is given to using no amino resins such as melamine-formaldehyde resins as crosslinking agents (c). The electrodeposition coating material composition of the invention therefore preferably comprises no amino resins such as melamine-formaldehyde resins.

The electrodeposition coating material composition of the invention is used preferably as a one-component (1K) coating composition. For this reason, the electrodeposition coating composition of the invention preferably contains no free polyisocyanates.

Optional Component (d)

The electrodeposition coating material composition of the invention may comprise at least one pigment different from the least one carbon black pigment used as component (b) and/or may comprise at least one filler as optional component(s) (d).

The term "filler" is known to the skilled person, from DIN 55943 (date: October 2001), for example. "Fillers" for the purposes of the present invention preferably are components, which are substantially, preferably entirely, insoluble in the application medium, such as the electrodeposition coating material composition of the invention, for example, and which are used in particular for increasing the volume. "Fillers" in the sense of the present invention preferably differ from "pigments" in their refractive index, which for fillers is <1.7.

Any customary filler known to the skilled person may be used as optional component (d). Examples of suitable fillers are kaolin, dolomite, calcite, chalk, calcium sulfate, barium sulfate, graphite, silicates such as magnesium silicates, especially corresponding phyllosilicates such as hectorite, bentonite, montmorillonite, talc and/or mica, silicas, especially fumed silicas, hydroxides such as aluminum hydroxide or magnesium hydroxide, or organic fillers such as textile fibers, cellulose fibers, polyethylene fibers or polymer powders; for further details, reference is made to Römpp Lexikon Lacke and Druckfarben, Georg Thieme Verlag, 1998, pages 250 ff., "Fillers".

Any customary pigment known to the skilled person may be used as optional component (d) as long as it is different from the pigment (b). Examples of suitable pigments are inorganic and organic coloring pigments. Examples of suitable inorganic coloring pigments are white pigments such as titanium dioxide, zinc white, zinc sulfide or lithopone; black pigments such as carbon black other than pigment (b)—although it is preferred that no further carbon black pigments besides pigment (b) are used —, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. Further inorganic coloring pigments are silicon dioxide, aluminum oxide, aluminum oxide hydrate, especially boehmit, titanium dioxide, zirconium oxide, cerium oxide, and mixtures thereof. Examples of suitable organic coloring pigments are monoazo pigments, disazo pigments, anthraquinone pigments, benzimidazole pigments, quinoacridone pigments, quinophthalone pigments, diketopyrrolopyrrol pigments, dioxazine pigments, indanthrone pigments, isoindoline pigments, isoindolinone pigments, azomethine pigments, thioindigo pigments metal complex pigments, perinone pigments, perylene pigments, phthalocyanine pigments or aniline black.

Component (d)—like component (b)—is preferably incorporated in the form of a pigment paste and/or filler paste into the electrodeposition coating material composition. It is possible and preferred that one pigment paste comprising both the pigment (b) and one or more further pigments and/or fillers as component(s) (d) each being different from the pigment (b) can be used. Such pastes typically include at least one polymer used as grinding resin. Preferably, therefore, there is at least one such polymer used as grinding resin included in the electrodeposition coating composition of the invention. It is possible that the at least one polymer (a) used as binder in the electrodeposition coating material composition can also additionally function as grinding resin in the pigment paste. The grinding resin in question is preferably an epoxide-amine adduct, which as outlined above may correspond to and/or can be subsumed under the definition of component (a). The polymer used as grinding resin preferably has building blocks which interact with the surfaces of the pigments. The grinding resins therefore preferably have the effect of an emulsifier. In many cases quaternary ammonium compounds are incorporated for the purpose of improving the grinding resin properties. The pigments are preferably ground together with a grinding resin to form a pigment paste. To produce the finished electrodeposition coating material composition, this paste is mixed with the rest of the constituents. The use of a pigment paste leads advantageously to a greater flexibility in electrodeposition coating, since the pigment and binder of the electrodeposition coating material composition can be readily adapted at any time to the requirements of practice via the amount of the pigment paste.

Further Optional Components

The electrodeposition coating material composition of the invention may include at least one component (e) a catalyst such as, for example, a metal-containing catalyst. In one preferred embodiment, however, the electrodeposition coating composition of the invention includes no catalyst such as a metal-containing catalyst. The catalyst optionally included is preferably a bismuth-containing catalyst. With particular preference it is possible to use a bismuth-containing catalyst, such as, for example, bismuth(III) oxide, basic bismuth(III) oxide, bismuth(III) hydroxide, bismuth(III) carbonate, bismuth(III) nitrate, bismuth(III) subnitrate (basic bismuth(III) nitrate), bismuth(III) salicylate and/or bismuth(III) subsalicylate (basic bismuth(III) salicylate), and also mixtures thereof. Especially preferred are water-insoluble, bismuth-containing catalysts. Preferred more particularly is bismuth (III) subnitrate. The electrodeposition coating material composition of the invention preferably includes at least one bismuth-containing catalyst in an amount such that the bismuth(III) content, calculated as bismuth metal, based on the total weight of the electrodeposition coating material of the invention, is in a range from 10 ppm to 20 000 ppm. The amount of bismuth, calculated as metal, may be determined by means of inductively coupled plasma-atomic emission spectrometry (ICP-OES) in accordance with DIN EN ISO 11885 (date: September 2009).

Depending on desired application, the electrodeposition coating material composition of the invention may comprise one or more commonly employed further additives as one or more optional components (f). Component (f) is different from any of components (a) to (e). Preferably, these additives are selected from the group consisting of wetting agents, emulsifiers, dispersants, surface-active compounds such as surfactants, flow control assistants, solubilizers, defoamers, rheological assistants, antioxidants, stabilizers, preferably heat stabilizers, process stabilizers, and UV and/or light stabilizers, flexibilizers, plasticizers, and mixtures of the aforesaid additives. The additive content may vary very widely according to intended use. The additive content, based on the total weight of the electrodeposition material coating composition of the invention, is preferably in the range of from 0.1 to 20.0 wt.-%, more preferably of from 0.1 to 15.0 wt.-%, very preferably of from 0.1 to 10.0 wt.-%, especially preferably of from 0.1 to 5.0 wt.-%, and more particularly of from 0.1 to 2.5 wt.-%.

Method for Electrocoating

A further subject of the present invention is a method for at least partially coating an electrically conductive substrate by cathodic electrodeposition coating comprising at least steps (1) to (5), namely
(1) immersing of the electrically conductive substrate at least partially into an electrodeposition coating bath, which comprises the electrodeposition coating material composition according to any of claims 1 to 9,
(2) connecting the substrate as cathode,
(3) depositing a coating film obtained from the electrodeposition coating material composition on the substrate using direct current,
(4) removing the coated substrate from the electrodeposition coating bath, and
(5) baking the coating film deposited on the substrate.

All preferred embodiments described hereinabove in connection with the electrodeposition coating material composition of the invention are also preferred embodiments with regard to the aforesaid method of the invention using this electrodeposition coating material composition for at least partially coating an electrically conductive substrate by cathodic electrodeposition coating.

The method of the invention is particularly suitable for the electrodeposition coating of automotive vehicle bodies or parts thereof including respective metallic substrates. Consequently, the preferred substrates are automotive vehicle bodies or parts thereof.

Suitability as electrically conductive substrate used in accordance with the invention are all electrically conductive substrates used customarily and known to the skilled person. The electrically conductive substrates used in accordance with the invention are preferably metallic substrates, more preferably selected from the group consisting of steel, preferably steel selected from the group consisting of bare steel, cold rolled steel (CRS), hot rolled steel, galvanized steel such as hot dip galvanized steel (HDG), alloy galvanized steel (such as, for example, Galvalume, Galvannealed or Galfan) and aluminized steel, aluminum and magnesium, and also Zn/Mg alloys and Zn/Ni alloys. Particularly suitable substrates are parts of vehicle bodies or complete bodies of automobiles for production.

Before the respective electrically conductive substrate is used in step (1) of the inventive method, it is preferably cleaned and/or degreased.

The electrically conductive substrate used in accordance with the invention is preferably a pretreated substrate, for example pretreated with at least one metal phosphate such as zinc phosphate. A pretreatment of this kind by means of phosphating, which takes place normally after the substrate has been cleaned and before the substrate is electrodeposition-coated in step (1), is in particular a pretreatment step that is customary in the automobile industry. Pretreatment methods other than phosphating are, however, also possible, for example a thin film pretreatment based on zirconium oxide.

During performance of steps (1), (2), and (3) of the method of the invention, the electrodeposition coating material composition of the invention is deposited cathodically on the region of the substrate immersed into the bath in step (1). In step (2), the substrate is connected as the cathode, and an electrical voltage is applied between the substrate and at least one counterelectrode, which is located in the deposition bath or is present separately from it, for example by way of an anion exchange membrane which is permeable for anions. The counterelectrode functions, accordingly, as an anode. On passage of electrical current between anode and cathode, a firmly adhering coating film is deposited on the cathode, i.e., on the immersed part of the substrate. The voltage applied here is preferably in a range from 50 to 500 volts. On performance of steps (1), (2), and (3) of the method of the invention, the electrodeposition coating bath preferably has a bath temperature in a range from 20 to 45° C.

The baking temperature in step (5) is preferably in a range from 120 to 210° C., more preferably from 120 to 205° C., very preferably from 120 to 200° C., more particularly from 125 to 195° C. or from 125° C. to 190° C., most preferably from 130 to 185° C. or from 140 to 180° C.

After having performed step (5) of the inventive method one or more further coating layers can be applied onto the baked coating film obtained after step (5). For example, a primer and/or filler can be applied, followed by a basecoat and a clearcoat.

Therefore, the inventive method preferably comprises at least one further step (6), namely (6) applying at least one further coating material composition, which is different from the composition applied in step (1), at least partially onto the baked coating film obtained after step (5).

Substrate

A further subject of the present invention is an electrically conductive substrate which is coated at least partially with a baked electrodeposition coating material of the invention. The baked coating material corresponds to the baked coating film obtained after step (5) of the inventive method.

All preferred embodiments described hereinabove in connection with the electrodeposition coating material composition of the invention and the method of the invention are also preferred embodiments with regard to the aforesaid at least partially coated substrate of the invention.

Use

A further subject of the present invention is a use of at least one carbon black pigment (b) as defined hereinbefore for improving the corrosion protection of electrically conductive substrates bearing a baked coating film obtained from an aqueous cathodically depositable electrodeposition coating material compositions comprising—besides the at least one carbon black pigment (b)—at least one cathodically depositable polymer (a) and/or for improving the homogeneity of the film build and/or for reducing the mapping of a coating film obtained from an aqueous cathodically depositable electrodeposition coating material compositions comprising—besides the at least one carbon black pigment (b)—at least one cathodically depositable polymer (a).

Preferably, the aqueous cathodically depositable electrodeposition coating material composition is the inventive aqueous cathodically depositable electrodeposition coating material composition.

All preferred embodiments described hereinabove in connection with the electrodeposition coating material composition of the invention, the method of the invention and the at least partially coated substrate of the invention are also preferred embodiments with regard to the aforementioned inventive use.

Methods

1. Determining the Non-Volatile Fraction

The nonvolatile fraction (the solids or solids content) is determined in accordance with DIN EN ISO 3251 (date: June 2019). This involves weighing out 1 g of sample into an aluminum dish which has been dried beforehand and drying the dish with sample in a drying cabinet at 180° C. for 30 minutes, cooling it in a desiccator, and then reweighing. The residue, relative to the total amount of sample employed, corresponds to the nonvolatile fraction.

2. Analysis of the Water-Soluble Fraction of Carbon Black Pigments by Using ICP-OES Inductively coupled plasma-atomic emission spectrometry (ICP-OES) in accordance with DIN EN ISO 11885 (date: September 2009) is used to investigate the water-soluble fraction of carbon black pigments such as the inventively used carbon black pigment (b) and to determine the quantity of unwanted elements/ions such as Na, K, Cl, S and Si present therein. The samples used for the ICP-OES measurements are prepared as follows and in accordance with DIN 19529 (date: December 2015): 10 g of the carbon black pigment is weighed into a 250 mL PE screw container and mixed with 80 mL deionized water. The conductivity of the deionized water was determined in advance. Subsequently, an elution of the sample was carried out for the period of 24 hours using an overhead shaker at 22 rpm. 20 mL of the resulting suspension was centrifuged and the aqueous fraction was purified over a 0.45 μm frit. The resulting aqueous fraction was then analyzed via ICP-OES. A SpectroBlue device of the company Spectro was used for the ICP-OES measurements.

3. Number-Based Median Primary Particle Size of Carbon Black Pigments

The number-based median primary particle size as well as the average primary particle size, and the minimum and the maximum particle size are determined by transmission electron microscopy (TEM). The microscope and device Tecnai G 20 of the company FEI is used for the TEM measurements. Bright-field image mode at 200 kV is used for the TEM measurements. The magnification of the microscope is calibrated according to ISO 29301:2010. The magnification is selected in a manner that the smallest particles observed are imaged on at least 10 pixels. The samples used for the TEM measurements are prepared as follows: a spatula tip of the carbon black pigment such as the inventively used carbon black pigment (b) is placed on a first microscope slide, followed by a drop of deionized water. With the assistance of a second microscope slide, the resulting mixture is rubbed. Then one slide is removed and the resulting rubbed film is transferred onto a sample carrier. The sample carrier is a 20 nm thick carbon foil on a 3 mm copper net. Then the sample is analyzed by TEM. The TEM images recorded are submitted to an automated evaluation. The evaluation is carried out with the ImageJ-Plugin Particle-Sizer Software developed within the framework of Nano-Define.

4. VDA Climate Change Test (DIN EN ISO 11997-1: 2018-01)

This climate change test is used to determine the corrosion resistance of a coating on a substrate. The climate change test is carried out in 5 or 10 so-called cycles.

If the coating of the samples to be tested is scored down to the substrate with a knife cut before the climate change test is performed, the samples can be tested for their degree of under-film corrosion in accordance with DIN EN ISO 4628-8 (03-2013), since the substrate corrodes along the scoring line during the climate change test. As corrosion progresses, the coating is more or less infiltrated during the test. The degree of undermining in [mm] is a measure of the corrosion resistance of the coating.

5. Salt Spray Test

The corrosion resistance of coatings is determined by a salt spray test. The salt spray testing is carried out according to DIN EN ISO 9227 NSS (date: September 2012) for the coated substrate under study. The samples under study are accommodated in a chamber in which at a temperature of 35° C.—continuously over duration of 504 hours or 1008 hours—a mist is produced from a 5% strength sodium chloride solution with a controlled pH in the range from 6.5 to 7.2. The mist deposits on the samples under study and covers them with a corrosive salt water film.

If prior to the salt spray testing according to DIN EN ISO 9227 NSS, the coating on the samples under study is scored down to the substrate with a blade incision, the samples can be investigated for their level of corrosive undermining to DIN EN ISO 4628-8 (03-2013), since the substrate corrodes along the score line during the DIN EN ISO 9227 NSS salt spray testing. As a result of the progressive process of corrosion, the coating is undermined to a greater or lesser extent during the test. The extent of undermining in [mm] is a measure of the resistance of the coating to corrosion.

7. Film Build and Mapping

The film build is determined according to DIN EN ISO 2178:2016-11. This method is also used to measure the differences in film build (mapping).

8. Surface Roughness

The surface roughness is determined according to DIN EN 10049:2014-03.

EXAMPLES

The following examples further illustrate the invention but are not to be construed as limiting its scope.

1. Preparation of Pigment Pastes 1.1 Inventively Used Pigment Paste P1

The following constituents listed in Table 1a hereinafter have been mixed with each other in this order in a dissolver. Then, milling was performed using a standard mill in order to obtain inventively used pigment paste P1.

TABLE 1a

Composition of pigment paste P1

| Constituent | Amount [wt.-%] |
| --- | --- |
| Grinding resin | 41.0 |
| Deionized water | 8.1 |
| Additives | 0.5 |
| Carbon black pigment CB1 | 0.8 |
| Catalyst | 4.0 |
| White pigment | 21.0 |
| Fillers | 24.6 |

As it is evident from Table 1c depicted hereinafter within item 1.3 CB1 is an inventively used pigment CB1. An epoxide-amine adduct has been used as grinding resin. All additives and other constituents present in P1 are commercially available products. Pigment paste P1 has a solid content of 66.6 wt.-%.

1.2 Comparatively Used Pigment Pastes P2 to P4

Comparatively used pigment pastes are prepared in the same manner as described in item 1.1 with the exception that not inventively used pigment CB1 has been used but instead pigment CB2 for P2, CB3 for P3 and CB4 for P4.

The compositions of pigment pastes P2, P3 and P4 are summarized in Table 1 b.

TABLE 1b

Composition of pigment pastes P2, P3 and P4

| Constituent | Amount present in paste P2 [wt.-%] | Amount present in paste P3 [wt.-%] | Amount present in paste P4 [wt.-%] |
| --- | --- | --- | --- |
| Grinding resin | 41.0 | 41.0 | 41.0 |
| Deionized water | 8.1 | 8.1 | 8.1 |
| Additives | 0.5 | 0.5 | 0.5 |
| Carbon black pigment | 0.8 (CB2) | 0.8 (CB3) | 0.4 (CB4) |
| Catalyst | 4.0 | 4.0 | 4.0 |
| White pigment | 21.0 | 21.0 | 21.0 |
| Fillers | 24.6 | 24.6 | 25.0 |

As it is evident from Table 1c depicted hereinafter within item 1.3 each of CB2, CB3 and CB4 is a non-inventively used carbon black pigment. An epoxide-amine adduct has been used as grinding resin. All additives and other constituents present in P2 to P4 are commercially available products. Except of the carbon black pigments the same constituents have been used as in case of pigment paste P1. Pigment paste P2 has a solid content of 66.3 wt.-%. Pigment paste P3 has a solid content of 66.0 wt.-%. Pigment paste P4 has a solid content of 67.3 wt.-%.

1.3 As it is evident from Table 1c depicted hereinafter CB1 is an inventively used pigment CB1, whereas CB2 to CB3 are non-inventively used lamp black pigment, as they exhibit a number-based median primary particle size of less than 50 nm. CB4 is also a non-inventively used carbon black pigment as it is a furnace black pigment (Monarch® 120 of the company Cabot) and, additionally, has a number-based median primary particle size of less than 50 nm.

TABLE 1c

Number-based median primary particle sizes

| | CB1 (inventive) | CB2 (non-inventive) | CB3 (non-inventive) | CB4 (non-inventive) |
| --- | --- | --- | --- | --- |
| Number-based median primary particle size ($d_{N,\,50\%}$) [nm] | 97.4 | 40.6 | 43.2 | 42.2 |

1.4 Further properties of pigments CB1 to CB4 are displayed in Tables 1d and 1e.

TABLE 1d

Further particle size measurement results

| | CB1 (inventive) | CB2 (non-inventive) | CB3 (non-inventive) | CB4 (non-inventive) |
|---|---|---|---|---|
| Average primary particle size [nm] | 115.6 | 45.4 | 53.1 | 47.4 |
| Minimum primary particle size [nm] | 15.4 | 7.7 | 8.0 | 8.0 |
| Maximum primary particle size [nm] | 500.3 | 846.2 | 923.5 | 252.0 |

TABLE 1e

Analysis of the water-soluble fraction of CB1 to CB4 by using ICP-OES

| Element/ion | CB1 [ppm] | CB2 [ppm] | CB3 [ppm] | CB4 [ppm] |
|---|---|---|---|---|
| Cl | 4 | 3 | 3 | 3 |
| Na | — | 0.2 | 0.4 | 0.2 |
| K | — | 0.1 | 0.1 | 6.5 |
| S | — | 73.5 | 114 | 4.1 |
| Si | — | 1.2 | 2.7 | 0.1 |

"—" = not detected

2. Preparation of Electrodeposition Coating Material Compositions 2.1 Preparation of an Inventive Aqueous Coating Material Composition I1

The following constituents listed in Table 2a hereinafter have been mixed with each other in this order and an inventive electrodeposition coating material I1 has been obtained.

TABLE 2a

Composition of electrodeposition coating material I1

| Constituent | Amount [parts by weight] |
|---|---|
| Aqueous binder and crosslinker dispersion | 2 668 |
| Deionized water | 2 451 |
| Pigment paste P1 | 380 |

The aqueous binder and crosslinker dispersion is a commercial product available from BASF Coatings GmbH, Germany (CathoGuard® 800) with a solid content of 38 wt.-% and containing an epoxide-amine adduct and a blocked polyisocyanate. The epoxide-amine adduct is different from the epoxide-amine adduct used as grinding resin for preparing pigment paste P1.

2.2 Preparation of Comparative Aqueous Coating Material Compositions C2 to C4

Comparative aqueous coating compositions are prepared in the same manner as described in item 2.1 with the exception that not inventively used pigment paste P1 has been used but instead pigment pastes P2, P3 and P4.

The compositions of coating material compositions C2 to C4 are summarized in Table 2b.

TABLE 2b

Compositions of electrodeposition coating material C2, C3 and C4

| Constituent | Amount present in C2 [parts by weight] | Amount present in C3 [parts by weight] | Amount present in C4 [parts by weight] |
|---|---|---|---|
| Aqueous binder and crosslinker dispersion | 2 668 | 2 668 | 2 668 |
| Deionized water | 2 450 | 2 450 | 2 450 |
| Pigment paste | 382 (pigment paste P2) | 384 (pigment paste P3) | 342 (pigment paste P4) |

The aqueous binder and crosslinker dispersion is a commercial product available from BASF Coatings GmbH, Germany (CathoGuard® 800) with a solid content of 38 wt.-% and containing an epoxide-amine adduct and a blocked polyisocyanate. The epoxide-amine adduct is different from the epoxide-amine adduct used as grinding resin for preparing pigment pastes P2 to P4.

3. Electrodeposition Coating of Substrates

Coating films obtained from the electrodeposition coating material compositions I1 and C2 to C4 are deposited on cathodically connected test panels within 2 minutes at a deposition voltage of 200-380 V and a coating bath temperature of 28-36° C., and baked at a substrate temperature of 150° C. to 190° C. for 15 minutes afterwards.

As test panels different substrates have been used, namely substrates S1 (bare steel) and S2 (steels substrates pretreated with a phosphatizing composition (Gardobond® GB26S 6800 OC)), S3 (galvanized steels substrates pretreated with a phosphatizing composition (Gardobond® GB26S 6800 OG)), and S4 (bare steel substrates pretreated with a thin film pretreatment (Oxsilan® 9831 W OC)).

In case of phosphatized substrates S2 and S3 a deposition voltage of 220-260 V and a coating bath temperature of 32° C. have been used. Baking was performed in an oven at an oven temperature of 175° C. for 25 minutes. In case of substrates S1 and S4 a deposition voltage of 180-240 V and a coating bath temperature of 32° C. have been used. Baking was performed in an oven at an oven temperature of 175° C. for 25 minutes.

4. Investigation of the Properties of the Coated Substrates 4.1 Film Build

The film builds of coated substrates 51, S2 and S3 have been measured.

The film build is determined according to DIN EN ISO 2178:2016-11 by measuring the dry layer thicknesses of the electrodeposition coatings obtained on the different substrates. The results are summarized in Table 4a.

TABLE 4a

Film builds

| Substrate | Voltage [V] | I1 [µm] | C2 [µm] | C3 [µm] | C4 [µm] |
|---|---|---|---|---|---|
| S1 | 180 | 20.6 | 21.0 | 20.7 | — |
| S1 | 220 | 21.4 | 21.5 | 23.3 | 22.5 |
| S1 | 240 | 20.7 | — | — | 26.4 |
| S2 | 240 | 19.3 | 20.9 | 21.1 | 20.0 |
| S2 | 260 | 20.8 | 22.4 | 23.1 | 23.5 |
| S3 | 240 | 19.7 | 22.0 | 21.5 | 22.4 |
| S3 | 260 | 20.4 | 23.4 | 23.3 | 23.3 |

"—" = not determined

4.2 Mapping

In a different experimental run the mappings (differences (Δ) in film build) observed for coated substrates S1 and S3 have been investigated. The results are summarized in Table 4b. For each of compositions I1, C2, C3 and C4 identical and specific application conditions on substrates S1 and S3 have been chosen that were adjusted to achieve a film build of about 20 μm on S3 in order to make a direct comparison possible as far as the occurrence of mapping is concerned. The applications on each of substrates S1 and S3 were conducted consecutively.

TABLE 4b

Differences (Δ) in film build

| Substrate | I1 [μm] | C2 [μm] | C3 [μm] | C4 [μm] |
|---|---|---|---|---|
| S1 | 20.3 | 24.5 | 23.0 | 25.0 |
| S3 | 20.1 | 19.8 | 19.6 | 20.5 |
| Δ film build | 0.2 | 4.7 | 3.4 | 4.5 |

4.3 Corrosion Protection (Salt Spray Test)

Coated substrates S1 (504 h) and S4 (1008 h) have been submitted to the salt spray test (NSS). The results are summarized in Table 4c.

TABLE 4c

Undermining after NSS

| Example/Comparative example | Undermining [mm] after 504 or 1008 h of NSS |
|---|---|
| I1 on S1 (inventive) | 1.2 |
| I1 on S4 (inventive) | 0.7 |
| C2 on S1 (comparative) | 2.3 |
| C2 on S4 (comparative) | — |
| C3 on S1 (comparative) | 2.6 |
| C3 on S4 (comparative) | — |
| C4 on S1 (comparative) | 3.2 |
| C4 on S4 (comparative) | 1.2 |

"—" = not determined

4.4 Corrosion Protection (VDA)

Coated substrates S2 (10 cycles) and S4 (10 cycles) have been submitted to the VDA test (VDA). The results are summarized in Table 4d.

TABLE 4d

Undermining after VDA

| Example/Comparative example | Undermining [mm] after 10 cycles of VDA climate change test |
|---|---|
| I1 on S2 (inventive) | 0.7 |
| I1 on S4 (inventive) | 1.2 |
| C2 on S2 (comparative) | 0.7 |
| C2 on S4 (comparative) | — |
| C3 on S2 (comparative) | 0.8 |
| C3 on S4 (comparative) | — |
| C4 on S2 (comparative) | 1.0 |
| C4 on S4 (comparative) | 1.5 |

"—" = not determined

The invention claimed is:

1. An aqueous cathodically depositable electrodeposition coating material composition comprising:
   (a) at least one cathodically depositable polymer;
   (b) at least one carbon black pigment, and
   (c) at least one crosslinking agent wherein the at least one carbon black pigment (b) is a lamp black pigment having a number-based median primary particle size ($d_{N,50\%}$) of at least 50 nm and at most 200 nm,
   wherein the at least one crosslinking agent is a blocked isocyanate, and wherein the at least one crosslinking agent does not comprise amino resins.

2. The electrodeposition coating material composition according to claim 1, wherein the at least one carbon black pigment (b) has a number-based median primary particle size ($d_{N,50\%}$) of at least 75 nm and at most 150 nm.

3. The electrodeposition coating material composition according to claim 1, wherein the at least one carbon black pigment (b) has an average primary particle size of at least 50 nm and at most 200 nm.

4. The electrodeposition coating material composition according to claim 1, wherein the at least one carbon black pigment (b) has a primary particle size in a range of 5 nm to 600 nm.

5. The electrodeposition coating material composition according to claim 1, wherein the at least one carbon black pigment (b) does not contain more than 50 ppm of sulfur in a water-soluble fraction obtained therefrom as measured by ICP-OES in accordance with DIN EN ISO 11885:2009-09.

6. The electrodeposition coating material composition according to claim 1, wherein the coating material composition is obtainable from mixing a pigment paste comprising at least the at least one carbon black pigment (b) with a mixture comprising at least water and the polymer (a).

7. The electrodeposition coating material composition according to claim 1, wherein the at least one carbon black pigment (b) is the only carbon black pigment present in the electrodeposition coating material composition.

8. The electrodeposition coating material composition according to claim 1, wherein the at least one carbon black pigment (b) is present in an amount in a range of 0.005 to 4.0 wt.-% in the electrodeposition coating material composition, based on a total weight of the electrodeposition coating material composition and/or is present in an amount in a range of 0.050 to 5.0 wt.-%, based on a total solids content of the electrodeposition coating material composition.

9. The electrodeposition coating material composition according to claim 1, wherein at least one epoxide-amine adduct is present as the at least one cathodically depositable polymer (a).

10. The electrodeposition coating material composition according to claim 1, wherein at least one epoxide-amine adduct is present as the at least one cathodically depositable polymer (a), which is a reaction product of at least one epoxy resin based on bisphenol A and at least one primary and/or secondary amine and/or salts thereof and/or at least one salt of a tertiary amine.

11. The electrodeposition coating material composition according to claim 1, wherein the at least one carbon black pigment (b) has an average primary particle size of at least 75 nm and at most 150 nm.

12. The electrodeposition coating material composition according to claim 1, wherein the at least one carbon black pigment (b) has an average primary particle size of at least 80 nm and at most 150 nm.

13. A method for at least partially coating an electrically conductive substrate by cathodic electrodeposition coating comprising at least steps (1) to (5):
   (1) immersing the electrically conductive substrate at least partially into an electrodeposition coating bath, which comprises the electrodeposition coating material composition according to claim 1,
(2) connecting the substrate as cathode,
(3) depositing a coating film obtained from the electrodeposition coating material composition on the substrate using direct current,
(4) removing the coated substrate from the electrodeposition coating bath, and
(5) baking the coating film deposited on the substrate.

14. The method according to claim 13, wherein the method comprises at least one further step (6):
(6) applying at least one further coating material composition, which is different from the composition applied in step (1), at least partially onto the baked coating film obtained after step (5).

15. An electrically conductive substrate which is at least partially coated with an electrodeposition coating material composition according to claim 1 in baked form.

16. A method of using the at least one carbon black pigment (b) according to claim 1 for improving corrosion protection of electrically conductive substrates bearing a baked coating film obtained from an aqueous cathodically depositable electrodeposition coating material composition comprising-besides the at least one carbon black pigment (b)—at least one cathodically depositable polymer (a) and/or for improving homogeneity of the film build and/or for reducing mapping of a coating film obtained from an aqueous cathodically depositable electrodeposition coating material compositions comprising—besides the at least one carbon black pigment (b)—at least one cathodically depositable polymer (a).

17. An electrically conductive substrate which is at least partially coated with an electrodeposition coating material composition which is obtainable by the method according to claim 13.

18. An electrically conductive substrate which is at least partially coated with:
an electrodeposition coating material composition comprising:
(a) at least one cathodically depositable polymer; and
(b) at least one carbon black pigment,
wherein the at least one carbon black pigment (b) is a lamp black pigment having a number-based median primary particle size ($d_{N,50\%}$) of at least 50 nm and at most 200 nm in baked form; and
an electrodeposition coating material composition which is obtainable by the method according to claim 13.

* * * * *